(12) United States Patent
Khandani et al.

(10) Patent No.: US 7,992,208 B2
(45) Date of Patent: Aug. 2, 2011

(54) DETECTION OF NONCONFORMING NETWORK TRAFFIC FLOW AGGREGATES FOR MITIGATING DISTRIBUTED DENIAL OF SERVICE ATTACKS

(75) Inventors: Mehdi Kalantari Khandani, College Park, MD (US); Mark A. Shayman, Potomac, MD (US)

(73) Assignee: University of Maryland, College Park, MD (US)

( * ) Notice: Subject to any disclaimer, the term of this patent is extended or adjusted under 35 U.S.C. 154(b) by 1296 days.

(21) Appl. No.: 11/522,895

(22) Filed: Sep. 19, 2006

(65) Prior Publication Data
US 2007/0064610 A1    Mar. 22, 2007

Related U.S. Application Data (60) Provisional application No. 60/718,386, filed on Sep. 19, 2005.

(51) Int. Cl.
G06F 11/00 (2006.01)
H04L 29/06 (2006.01)
G08C 15/00 (2006.01)

(52) U.S. Cl. ......... 726/25; 726/1; 726/2; 726/3; 726/6; 726/12; 726/13; 726/14; 726/22; 726/23; 726/24; 726/26; 726/30; 713/151; 713/152; 713/153; 713/154; 713/160; 713/176; 370/231; 370/232; 370/234; 370/235; 370/237; 370/229; 370/320; 709/224; 709/225

(58) Field of Classification Search .............. 726/25, 726/22; 713/151, 175; 370/232, 234
See application file for complete search history.

(56) References Cited

U.S. PATENT DOCUMENTS

| 6,005,855 | A   | * | 12/1999 | Zehavi et al. ............ 370/335 |
| 6,351,773 | B1  | * | 2/2002  | Fijolek et al. ............ 709/228 |
| 6,370,587 | B1  |   | 4/2002  | Hasegawa et al. |
| 6,934,256 | B1  | * | 8/2005  | Jacobson et al. .......... 370/235 |
| 7,047,303 | B2  | * | 5/2006  | Lingafelt et al. .......... 709/229 |
| 7,359,974 | B1  | * | 4/2008  | Quinn et al. ............. 709/228 |
| 7,774,849 | B2  | * | 8/2010  | Russell et al. ............. 726/25 |
| 7,782,774 | B2  | * | 8/2010  | Cheriton ................. 370/232 |
| 2002/0007360 | A1 | * | 1/2002 | Hawkinson ................. 707/4 |
| 2002/0032717 | A1 | * | 3/2002 | Malan et al. ............. 709/105 |
| 2002/0163926 | A1 |   | 11/2002 | Moharram |
| 2003/0145232 | A1 | * | 7/2003 | Poletto et al. ............ 713/201 |

(Continued)

OTHER PUBLICATIONS

International Search Report from the corresponding PCT Application PCT/US07/78903.

Primary Examiner — Michael J Simitoski
Assistant Examiner — Jenise E Jackson
(74) Attorney, Agent, or Firm — Rosenberg, Klein & Lee (57) ABSTRACT

An estimate of a portion of network traffic that is nonconforming to a communication transmission control protocol is used to signal that a distributed denial of service attack may be occurring. Traffic flows are aggregated and packets are intentionally dropped from the flow aggregate in accordance with an assigned perturbation signature. The flow aggregates are observed to determine if the rate of arrival of packets that have a one-to-one transmission correspondence with the dropped packets are similarly responsive to the perturbation signature. By assigning orthogonal perturbation signatures to different routers, multiple routers may perform the test on the aggregate and the results of the test will be correctly ascertained at each router. Nonconforming aggregates may be redefined to finer granularity to determine the node on the network that is under attack, which may then take mitigating action.

16 Claims, 8 Drawing Sheets

U.S. PATENT DOCUMENTS

| | | | | |
|---|---|---|---|---|
| 2003/0233445 A1* | 12/2003 | Levy et al. | | 709/224 |
| 2004/0158626 A1* | 8/2004 | Douglas | | 709/224 |
| 2004/0215976 A1 | 10/2004 | Jain | | |
| 2004/0233846 A1 | 11/2004 | Khandani et al. | | |
| 2005/0039104 A1* | 2/2005 | Shah et al. | | 714/776 |
| 2005/0050364 A1* | 3/2005 | Feng | | 713/201 |
| 2005/0152375 A1* | 7/2005 | An et al. | | 370/395.41 |
| 2005/0195840 A1* | 9/2005 | Krapp et al. | | 370/401 |
| 2005/0198519 A1* | 9/2005 | Tamura et al. | | 713/188 |
| 2005/0226149 A1* | 10/2005 | Jacobson et al. | | 370/229 |
| 2005/0254465 A1* | 11/2005 | Lundby et al. | | 370/335 |
| 2006/0126509 A1* | 6/2006 | Abi-Nassif et al. | | 370/235 |
| 2006/0187877 A1* | 8/2006 | Lundby et al. | | 370/328 |
| 2006/0229079 A1* | 10/2006 | Cheng et al. | | 455/450 |
| 2007/0032907 A1* | 2/2007 | Hanson et al. | | 700/274 |
| 2007/0192863 A1* | 8/2007 | Kapoor et al. | | 726/23 |

* cited by examiner

DETECTION OF NONCONFORMING NETWORK TRAFFIC FLOW AGGREGATES FOR MITIGATING DISTRIBUTED DENIAL OF SERVICE ATTACKS

RELATED APPLICATION DATA

This Application is based on U.S. Provisional Patent Application 60/718,386, filed on 19 Sep. 2005.

BACKGROUND OF THE INVENTION

1. Field of the Invention

The invention described herein is related to determining an amount of noncompliant communication network traffic for purposes of detecting a distributed denial of service (DDoS) attack. More specifically, the present invention actively drops certain packets from an aggregate of traffic flows in a communication network and then measures the data traffic rate subsequent thereto. In so doing, the present invention can determine an amount of traffic not conforming to the transmission protocol of the aggregate, which is an indication of a DDoS attack.

2. Description of the Prior Art

A distributed denial of service (DDoS) attack is a communication disruption technique for hindering applications used, generally, to conduct electronic commerce over the Internet. Current operational speeds of network equipment allow participants in a DDoS attack to inject into the Internet a tremendous amount of pernicious traffic over a very short time interval in so called "traffic storms" to intentionally cause disruptions in Internet communications.

A traffic flow is defined as a stream of data packets emanating from the same source and bound for the same destination and which are transported along the same path. In Applicants' previously-filed U.S. patent application Ser. No. 10/825,111, the conformance of an aggregate of traffic flows to a communication protocol, e.g., the Transmission Control Protocol (TCP), was measured by perturbing the rate of traffic belonging to that aggregate, e.g., by intentionally dropping a small number of packets, and observing how the traffic rate of the aggregate responds. A compliant TCP aggregate is predictable in its response to instantaneous packet drops and that predictability is exploited to measure conformance of the aggregate to the protocol. This method is referred to as the Aggregate Perturbation Method (APM).

One complication of APM is that, in a distributed implementation, interference may result from simultaneous tests being performed at different routers. That is to say, flows in an aggregate may experience perturbations by tests executed at each of multiple routers leading to erroneous measurements. To be effective in such a distributed application, a router should measure the response to its own perturbation and such measurement should not be influenced by the perturbations applied at other routers. As described in the above-cited U.S. patent application Ser. No. 10/825,111, a solution to this problem is inspired by the direct-sequence spread-spectrum code division multiple access (CDMA) approach in multiple access communication channels. According to the technique, each router is assigned a packet dropping signature to specify a corresponding packet dropping rate as a function of time. Each participating router is assigned a signature that is orthogonal in some sense to the signature of other such routers. Under certain assumptions, this approach enables each individual router to measure conformance to the transmission protocol of aggregates passing through it without requiring any information to be shared with the other routers. This technique is referred to as the CDMA-based Aggregate Perturbation Method (CAPM).

A technical limitation of CAPM, as described in U.S. patent application Ser. No. 10/825,111, lies in the fact that a nominal traffic response to dropped packets depends on such traffic characteristics as the average lifetime of the flows forming the aggregate, the round trip times of transmitted packets, and the statistical distribution of the congestion control window size. Thus, when a single packet is dropped from an aggregate, the corresponding rate reduction is only known if long-term statistical measurements of the aggregate are available. Such limitation is prohibitive in DDoS applications, where rapid detection and response is desired.

Several techniques for mitigating DDoS attacks are known in the art, including pushback, traceback, and ingress filtering. Pushback includes detection of an attack, identification of the attack signature, and notification to an upstream traffic filter to limit the rate of the attack traffic. Traceback techniques are designed to follow the offending traffic's path to, ultimately, the source of the attack. In certain prior art systems, routers store hashed information on recently received packets to recover the paths to the packet source in the event that traceback is needed.

In ingress filtering, edge routers check the validity of the source Internet Protocol (IP) addresses of the packets. A packet with a source IP address that does not belong to any of the valid sources in the network is filtered by the edge router of that network. In another technique, the traffic at an egress router of a stub domain is monitored to determine whether the ratio of outgoing to incoming traffic for a set of remote addresses is abnormally high. A high ratio is taken as a signal that an attack is being mounted from within the stub domain.

Research has been conducted to identify and model Transmission Control Protocol (TCP) traffic in flows under steady state conditions. For example, the steady state throughput of a TCP flow may be compared with a theoretically predicted value to identify conforming flows. This technique has been used in the past to identify and penalize nonconforming flows for congestion control purposes. One such technique, referred to as Stochastic Fair Blue, performs a per-flow test for responsiveness by mapping different flows to parallel bins relying on the fact that the bins containing a nonconforming flow are likely to be overloaded. However, if many nonconforming flows exist, it is likely that many bins are overloaded and the procedure will not be able to distinguish between conforming and non-conforming flows.

Given the state of the prior art, the need is apparent for a technique to rapidly identify the onset of a DDoS attack without the requirement of long-term compilations of historical data and without the need to share information among participating routers to identify the attack.

SUMMARY OF THE INVENTION

In one aspect of the invention, a method is provided for detecting protocol noncompliant communication network traffic indicative of a distributed denial of service attack on a node of a communication network. The network traffic includes information packets formatted in compliance with a communication network protocol and having an indication of an address of a source node in the network and an indication of an address of a destination node in the network. Each of the packets belongs to a corresponding one of a plurality of traffic flows such that the packets of each of the traffic flows are addressed from a common source node and addressed to a common destination node. The traffic flows are each assigned to a corresponding one of a plurality of traffic flow aggregates such that a portion of the address of the common destination node is common to the traffic flows in that aggregate. The traffic flows in the aggregates include first packets and second packets such that the second packets are transmitted only upon one of either success or failure of transmission of the first packets. A plurality of the first packets is dropped from each of the traffic flow aggregates at a packet dropping rate set in accordance with a predetermined drop signature. A noncompliant aggregate is identified as one of the traffic flow aggregates having second packets received at an arrival rate noncompliant with the communication network protocol as conditioned by the packet dropping rate and an attacked node is identified from the portion of the address of the common destination node common among the traffic flows of the noncompliant aggregate.

In another aspect of the invention, a method is provided for detecting protocol noncompliant communication network traffic indicative of a distributed denial of service attack on a node of a communication network having a plurality of switching nodes for routing information packets between a plurality of source nodes and a plurality of destination nodes. The network traffic includes information packets formatted in compliance with a communication network protocol and having an indication of an address of a source node in the network and an indication of an address of a destination node in the network. Each of the packets belong to a corresponding one of a plurality of traffic flows such that the packets of each of the traffic flows are addressed from a common source node and addressed to a common destination node. Each of the traffic flows are assigned to a corresponding one of a plurality of traffic flow aggregates such that a portion of the address of the common destination node is common to the traffic flows in the corresponding aggregate. The traffic flows in the aggregates include first packets and second packets such that the second packets are transmitted only upon one of either success or failure of transmission of the first packets. A plurality of the first packets is dropped from each of the traffic flow aggregates at each of a plurality of routing nodes. The first packets being dropped at a packet dropping rate set in accordance with a predetermined drop signature, where the drop signature is orthogonal to the drop signature at other routing nodes. A noncompliant aggregate is identified at a routing node as one of the traffic flow aggregates having second packets received at an arrival rate noncompliant with the communication network protocol as conditioned by the packet dropping rate. An attacked node in the communication network is identified from the portion of the address of the common destination node common to the traffic flows of the noncompliant aggregate.

In yet another aspect of the invention, a system detects protocol noncompliant communication network traffic indicative of a distributed denial of service attack on a node of a communication network. The network traffic includes information packets formatted in compliance with a communication network protocol and having an indication of an address of a source node in the network and an indication of an address of a destination node in the network. Each of the packets belong to a corresponding one of a plurality of traffic flows such that the packets of each of the traffic flows are addressed from a common source node and addressed to a common destination node. The system includes an aggregate classifier assigning each of the traffic flows to a corresponding one of a plurality of traffic flow aggregates such that a portion of the address of the common destination node is common to the traffic flows in the corresponding aggregate. The traffic flows in the aggregates include first packets and second packets such that the second packets are transmitted only upon one of either success or failure of transmission of the first packets. A perturbation signature generator generates a drop signature having characteristics that are orthogonal to other drop signatures at other nodes in the communication network. A packet dropper is coupled to the perturbation signature generator and drops a plurality of first packets from each of the traffic flow aggregates in accordance with the drop signature. A conformance estimator is coupled to the aggregate classifier and identifies a noncompliant aggregate as one of the traffic flow aggregates having second packets received thereat noncompliant with the communication network protocol as conditioned by the dropped packet rate. A target identifier is coupled to the conformance estimator and identifies an attacked node in the communication network from the portion of the address of the common destination node common to the traffic flows of the noncompliant aggregate.

DETAILED DESCRIPTION OF PREFERRED EMBODIMENTS

Figures 1, 2:
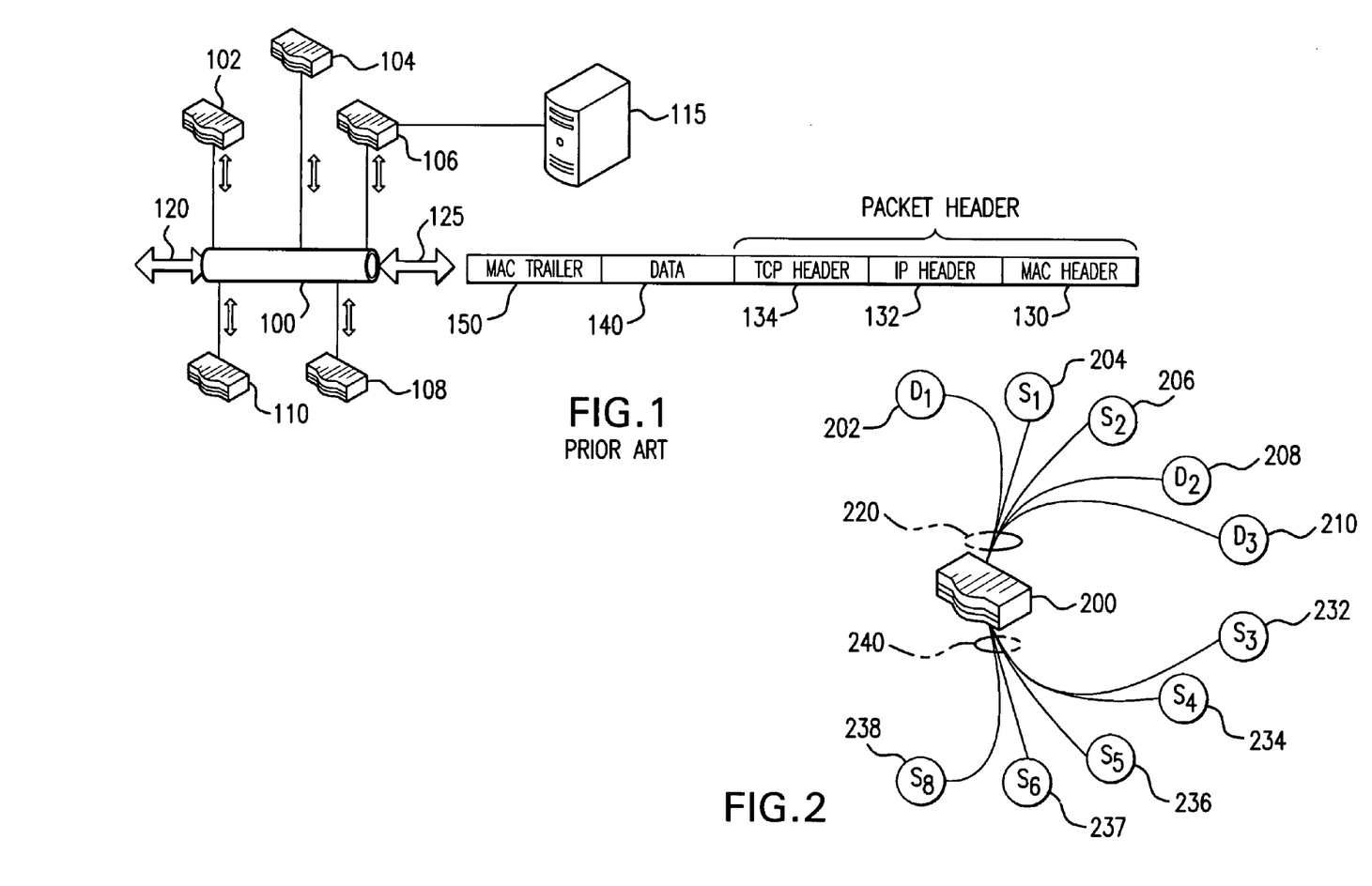
FIG. 1 is a schematic block diagram illustrating key components of a communication network of the prior art.
FIG. 2 is a diagram illustrating grouping of traffic flows into aggregates in accordance with the present invention.

Referring to FIG. 1, there is diagrammatically shown several key components of a traditional communications network. For the purposes of describing the present invention and not for limiting the scope thereof, the network of FIG. 1 is assumed to be the Internet operating under the TCP/IP (Transmission Control Protocol/Internet Protocol). At any section 100 of the network, a plurality of data flows 120 enters and a plurality of data flows 125 exits. A flow, as described above, is a stream of data packets with the same source and destination and which are transported along the same path.

At any portion 100 of the network of FIG. 1, one or more routers 102, 104, 106, 108, and 110, or other switching devices, may be coupled to the network to forward the data packets towards their final destination. As is known in the art, this is possible in that a data packet will include a packet designator, e.g., a packet header that maintains the information necessary to route the packet to its destination, which may be a server 115. An exemplary packet header 170, as is known in the art, may be a composite of media access control (MAC) header 130, an IP header 132 and a TCP header 134. In certain embodiments, the packet may include a trailer, such as the MAC trailer 150. Suitable to the invention, an IP header includes a source address of the sending node and a destination address of the intended receiver node. Additionally, the TCP header includes information such as packet transmission sequence numbers, a flag indicating if the packet is a synchronization (SYN) packet for establishing a connection and a flag indicating if the packet is an acknowledge (ACK) packet for acknowledging receipt at the receiving node of a corresponding previously transmitted packet. The TCP header may also include other information useful in forming traffic flow aggregates, to be described below, such as port numbers and application types. An application type may be derived, in many cases, from a source port field and/or a destination port field as is known in the art. The packet header 170 is attached to a datagram 140 to form a packet of the prescribed protocol, e.g., TCP/IP.

FIG. 2 illustrates the formation of aggregates in accordance with the present invention. An aggregate is a set of flows having at least one link or node in common in their path from source to destination and having a common property among all packets belonging to the flows. For example, router 200 represents a common node in the path of traffic sources 204, 206, 232, 234, 236, 237, and 238, and traffic sinks 202, 208, and 210. If all traffic at router 200 from sources 232, 234, 236, 237, and 238 are directed to a single destination, e.g., a web server on the Internet, an aggregate 240 may be formed from the flows from those sources. The common property of the flows defining the aggregate 240 is the common destination of the packets within the flows. Certain embodiments of the invention take as the common characteristic of an aggregate to be a portion of the destination address so as to have a smaller number of aggregates during normal operating periods, such as periods where no DDoS attack is occurring. A second aggregate 220 may be formed of the flows of all TELNET traffic between nodes 202, 204, 206, 208, and 210. In this case, the flows of aggregate 220 have an application in common, i.e., TELNET.

It is considered a beneficial feature of the invention that conformance measures are performed on flow aggregates as opposed to making such measurement on the flows themselves. Aggregate-based conformance testing is suited to the Internet in that the majority of Internet traffic is composed of short-lived flows known as the Internet mice. It is extremely difficult to perform tests on such traffic at the flow level of granularity because the flows generally have a small number of packets, are active for only a few round trip times, and often end before a router can acquire useful statistical information about them. However, if many such flows are considered together as an aggregate, even if the many flows forming the aggregate appear, survive for a few round trip times, and disappear, statistical properties for the aggregate as a whole can be ascertained and used to measure protocol conformance of the constituent flows.

A key characteristic of TCP traffic is in its mechanisms for overcoming errors due to dropped packets. As is well-known, TCP implements a sliding window protocol to control the number of unacknowledged packets within the network. The degree to which a TCP aggregate reduces its rate in response to packet drops depends on packet size, round trip time, and the distribution of window sizes among the constituent flows. An aggregate that includes non-cooperative or malicious flows that do not participate in the TCP congestion control algorithm are referred to as having flows that are nonconforming, or equivalently, as nonconforming aggregates.

The present invention measures nominal conformance to the traffic control protocol of traffic flow aggregates without regard to long-term statistical characteristics of the aggregates. The beneficial features of the invention are suited for DDoS detection and defense in that the conformance tests do not depend on accumulated historical data. Furthermore, the conformance tests may be applied to finer granularity sub-aggregates of an aggregate upon positive initial test results so as to identify the flows of the aggregate having a higher concentration of non-compliant traffic. DDoS tests of the prior art do not operate well at sub-aggregate granularity in that historical data is only accumulated for the aggregate and the statistical characteristics of sub-aggregates are generally unknown.

Figure 3:
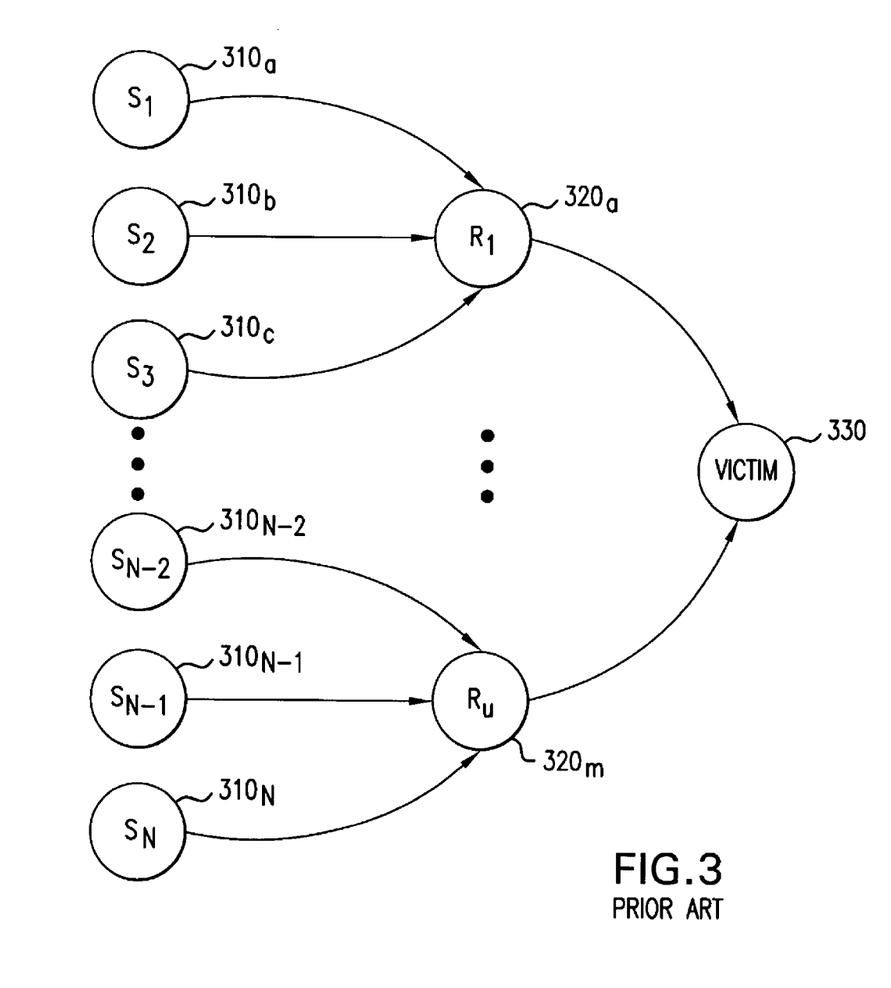
FIG. 3 is a node diagram illustrating a distributed denial of service attack.

Referring now to FIG. 3, there is shown a functional block diagram of primary elements of a DDoS attack. As is shown in the Figure, a DDoS victim 330 receives traffic forwarded thereto via routers 320*a*-320*m*. The traffic is generated at sources 310*a*-310N. Attack traffic is distinguished from legitimate traffic by its failure to conform to TCP congestion control mechanisms. Such nonconformance may manifest itself in failure of DDoS sources to reduce their sending rate responsive to packet drops, failure of the DDoS contributing TCP traffic to follow the handshake and state transitions specified for establishing a connection or failure to retransmit the packets dropped by the network at the time of congestion. In certain cases, DDoS traffic consists of packets containing spoofed source addresses for purposes of hiding the real attack sources. Such spoofed traffic is, by its very nature, nonconforming to TCP, as well as other communication protocols. In other cases, bandwidth-clogging TCP attacks may send sequences of TCP packets without first establishing a connection in accordance with connection setup procedures. Such traffic is also inherently nonconforming, but, even if the attacking flows set up legitimate TCP connections, they may not reduce their sending rate in response to packet drops, which would obviously defeat the purpose of a DDoS attack.

Figure 4A:
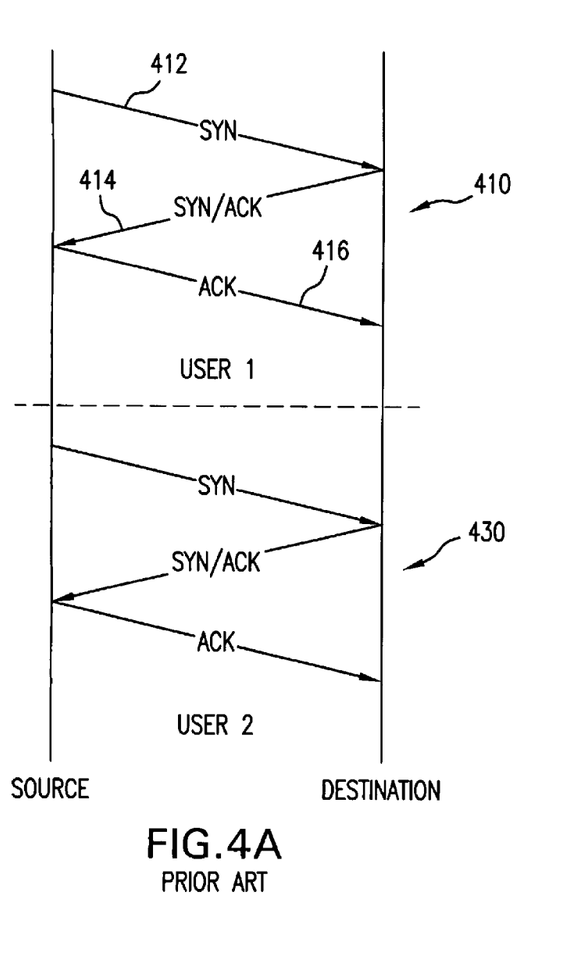
FIGS. 4A and 4B are diagrams illustrating a Transmission Control Protocol three-way handshake to demonstrate a SYN-flood denial of service attack.
Figure 4B:
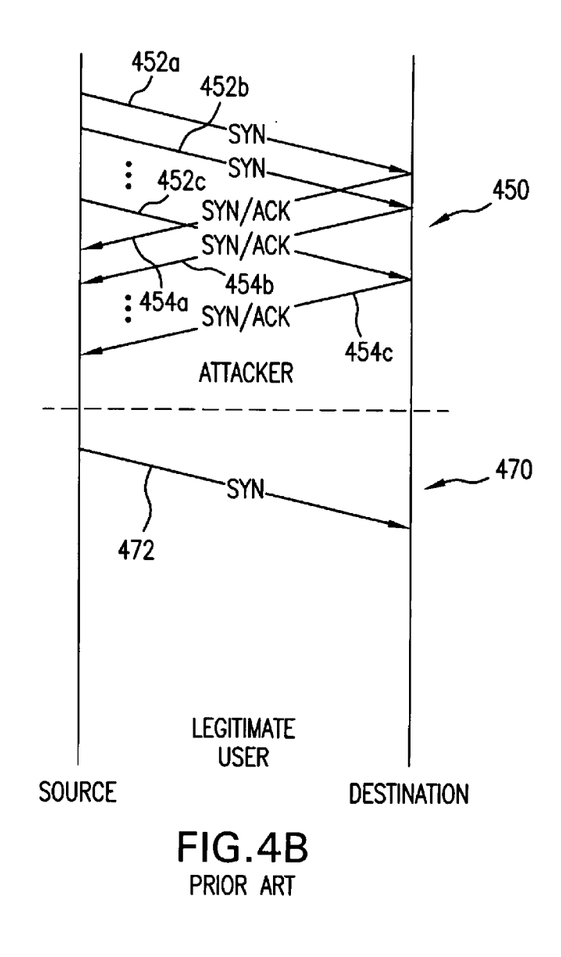

A typical DDoS attack technique referred to as a SYN-flood is illustrated in FIGS. 4A-4B. As is shown in FIG. 4A, in accordance with TCP protocol, a connection between a source and destination node is established by a mechanism referred to as a three-way handshake. A first user, User 1, establishes a first connection as illustrated at 410. The source node at the first user's location transmits a SYN packet 412 to the destination node. Upon receiving the SYN packet, the destination node allocates resources for the connection and transmits back to the source node an acknowledgement of the SYN packet by way of a SYN/ACK packet. At this point, the connection is considered "half-open". Once the destination node has received a subsequent ACK packet 410 from the source node, the connection is considered "open" and substantive communication may begin.

Under normal conditions, such connections are short-lived; once users have completed some transaction with a destination node, they terminate the connection and thereby free resources. As long as there are free connection resources, another user, e.g., User 2 of FIG. 4A, may establish a connection with a three-way handshake 430.

In a SYN-flood attack 450, as shown in FIG. 4B, an attacker will send from multiple, hijacked nodes, for example, a large number of SYN packets 452*a*-452*c*. In compliance with the protocol, the attacked node will send respective SYN/ACK packets 454*a*-454*c*, one to each of the DDoS participant nodes. However, the attacking nodes will not send a corresponding ACK packet back to the destination, thereby leaving all of the connections half-open. This consumes resources and those resources remain bound to the half-open connection for a predetermined waiting time period. Meanwhile, if a legitimate user attempts a connection 470 by the transmission of a SYN packet, there will be no available resources to establish the connection and the legitimate user will be denied service.

The present invention introduces a technique for quantifying conformance of a TCP aggregate and applying the measure of a conformance to detect a DDoS attack. The invention estimates the proportion of nonconforming packets in a TCP aggregate. In this scheme, a router divides its received traffic into several aggregates and performs tests on each one. When a test on an aggregate returns positive, it may be followed up by another test to achieve a higher level of confidence, or it may break down the aggregate into smaller sub-aggregates and perform the test for sub-aggregates in order to further isolate groups of packets contributing to a DDoS attack.

In accordance with the present invention, a measure of conformance to traffic control protocol of the aggregate rate along a perturbation signature may be given as:

$$\alpha = \int_0^T s^a(t)\lambda(t)dt, \quad (1)$$

in which $\alpha$ is a conformance metric of the aggregate, T is duration of the perturbation test, $\lambda(t)$ is the packet arrival rate of the aggregate as a function of time t, and $s^a(t)$ is the AC component of the perturbation signature over interval [0, T]:

$$s^a(t) = s(t) - \frac{1}{T}\int_0^T s(t)dt. \quad (2)$$

If the total drop rate r(t) of the aggregate is defined as r(t)=As(t), the value of $\alpha/A$ may be defined as the conformance coefficient of the aggregate. This quantity deviates from its nominal value if an aggregate is contaminated by nonconforming traffic contributing to a DDoS attack.

When perturbation tests are performed on an aggregate, it is possible that all or part of that aggregate may be influenced by another perturbation test being conducted by an upstream or downstream router, and erroneous results from such simultaneous tests at different routers are preferably avoided. The present invention overcomes this problem by proper assignment of perturbation signatures. K routers may perturb an aggregate simultaneously and without regard to another router's test if each router is uses a perturbation rate $r_k(t)=A_k s_k(t)$ in accordance with a corresponding perturbation signature that is orthogonal in a known sense to other signatures, i.e.:

$$\int_0^T s_i^a(t)s_j^a(t)dt = 0, \text{ for } i \neq j. \quad (3)$$

Assuming that the overall drop rate $r(t)=\Sigma_k r_k(t)$ is small enough so that the system with input r(t) and output $E[\lambda(t)]$ can be approximated by a linear system and further assuming the holding time of the piecewise constant functions $r_k(t) = A_k s_k(t)$ on each constant interval is large enough compared to the round trip time of the majority of flows, then under the orthogonality assumption of (3) the conformance coefficient measured at each router is independent of the tests being performed by the other routers. The orthogonal drop signatures remove the possibility of mutual interference of simultaneous perturbations at different routers.

In accordance with certain embodiments of the invention, a protocol conformance test estimates a portion of nonconforming TCP SYN packets in an aggregate. The test is based on the one-to-one transmission correspondence of SYN and ACK packet pairs. As described above, a normal TCP connection is established through a three-way handshake at the start of each session. A client sends a SYN packet to a server, and the server sends a SYN/ACK packet back to the client. The client then sends an ACK packet to the server to complete the connection.

In a normal TCP aggregate, the average arrival rate of SYN packets is equal to the average arrival rate of ACK packets that complete the handshake. However, it is to be understood that, in addition to the ACK packets being sent as a part of the three-way handshake, other ACK packets exist in the aggregates to acknowledge receipt of substantive data packets in accordance with TCP. The TCP sequence numbers in the TCP headers are used in certain embodiments of the invention to distinguish the ACK packets being sent in response to SYN/ACK packets from other ACK packets. Unless otherwise stated, the term "ACK packets" will refer to those ACK packets being sent in accordance with the three-way TCP handshake.

To estimate the nonconforming portion of TCP SYN packets in an aggregate, a signature waveform is used to perturb the aggregate by dropping a small portion of SYN packets in a known way and then observing the response of the aggregate to the dropped SYN packets. For each SYN packet that is not dropped, an ACK packet should be received after a short period (about the round trip time of the connection), and for each dropped SYN, the ACK packet should not be observed for at least the retransmission time of the SYN, which is usually in the order of 3 seconds, and much longer than the typical round trip time of connections, which is in the order of 100 milliseconds.

Perturbations to the SYN packets are done by dropping a small number thereof with rate r(t)=As(t), in which A is the drop rate amplitude and s(t) is the signature of perturbation. The drop signature s(t) is generated by, in certain embodiments, a binary sequence, or codeword, of length N denoted by $\{c_1, c_2, \ldots, c_N\}$. Each binary number in this sequence represents a time interval of length $T_c$, known as the chip interval. If $c_i$ is 1, packets are dropped with rate A in the corresponding interval of length $T_c$, otherwise no SYN packets are dropped. This scheme is equivalent to the following definition of the signature waveform:

$$s(t) = \sum_{j=1}^N c_j p_{T_c}(t - (j-1)T_c), \quad (4)$$

in which $p_{T_c}(t)$ is known as the chip function and is analogous to that in the literature of CDMA spread spectrum communication; it is 1 in interval $[0, T_c]$, and 0 otherwise.

Dropping SYN packets with rate r(t) causes the arrival rate of SYN packets and ACK packets to become unbalanced for the intervals during which packets are dropped. In other words, dropping SYNs will cause the number of arriving ACK packets to be reduced during perturbation intervals, and the average difference of the rate of arrival of SYN packets and the rate of arrival of ACK packets at the router will be r(t). This observation is used to distinguish the SYN packets that conform to the transmission control protocol from the nonconforming SYN packets.

Assume $\lambda_S(t)$ represents the arrival rate of the SYNs at a router, and $\lambda_A(t)$ represents the arrival rate of ACKs. A matched filter output may be defined by:

$$\alpha = \int_0^{NT_e} (\lambda_S(t) - \lambda_A(t))s^\alpha(t)dt. \quad (5)$$

Under normal traffic conditions, i.e., when no DDoS attack is occurring, $\lambda_S(t) - \lambda_A(t) \approx r(t)$, which leads to the following matched filter output:

$$\alpha = A \int_0^{NT_c} [s^\alpha(t)]^2 dt, \quad (6)$$

In certain embodiments of the invention, the binary sequence $\{c_1, c_2, \ldots, c_N\}$ is chosen to have an even number of ones and zeros resulting in a DC component is ½. Thus, $s^\alpha(t) = s(t) - ½$ and $s^\alpha(t)$ takes on only two values: $-½$ and $½$.
This leaves $[s^\alpha(t)]^2 = ¼$, and $$\int_0^{NT_c} [s^\alpha(t)]^2 dt = \frac{1}{4} NT_c. \quad (7)$$

By substituting equation (7) into equation (6), the predicted output of a matched filter under normal conditions of the network may be given by:

$$\alpha = \frac{1}{4} ANT_c. \quad (8)$$

If m represents the total number of packet drops made by the test, $$\alpha = \frac{m}{2}. \quad (9)$$

Deviation of the matched filter output from the above nominal value may be used to estimate the portion of nonconforming SYN packets in the aggregate. Since SYN packets belonging to a TCP SYN flood attack do not respond in the manner compliant with the protocol, deviation of matched filter output from its nominal value will be observed during the attack.

If the overall perturbation applied by K routers to an aggregate, $$r(t) = \sum_{k=1}^{K} A_k s_k(t),$$

is small enough so that the probability of dropping both a SYN and it retransmitted SYN after the timeout is negligible and every pair of perturbing routers is assigned a perturbation signature that is orthogonal to other routers in the aggregate, then the matched filter output defined by equation (5) at each of the routers is independent of the perturbations performed by the other routers. Significance of this is the fact that the perturbation tests can be performed in a distributed manner by different routers without being affected by possible interference resulting from different simultaneous tests.

It is to be noted that in order for the orthogonality assumption of the signatures to hold, the routers need to synchronize the starting times of their tests, which may be impractical. The same problem holds in spread spectrum CDMA communication. The present invention overcomes this problem by using perturbation codes that are orthogonal to each other and having a code length that is sufficiently long, e.g., twenty (20) bits or longer. This solution is analogous to pseudonoise codes in the CDMA art and, as is known, codes generated by this scheme are approximately orthogonal even with variable offsets.

Certain embodiments of invention extend the approach described above for all packets that use retransmission schemes in response to packet losses. That is to say, the invention is applicable when there is a one-to-one transmission correspondence between a first packet (the dropped packet) and a second packet (the retransmitted packet). This category includes TCP data packets as well as certain non-TCP packets, such as DNS queries. The invention may be used for such packets if (1) packets that are dropped are retransmitted within a finite timeout period and (2) there is an identifier field that can be utilized to identify the packet as a retransmission of a dropped packet. For TCP packets, the sequence number may be used, i.e., the 32-bit randomly generated numbers initialized during the establishment of the connection and incremented in accordance with progress in the transmission of data octets for subsequent packets. For DNS queries, the 32-bit field known as the transaction ID may be used for the purpose of the conformance test.

To detect packet retransmissions in these applications of the invention, a short term memory may be used in which a flag is set for every packet observed. For every incoming packet on a link, the packet ID may be extracted and used as an index into memory. In certain embodiments, a flag at the location in memory being pointed to by the ID is set upon receiving each packet and is reset when the retransmission of that packet is observed.

The above book-keeping scheme may require an extensive memory if a location for every packet ID is considered. For example, if the packet ID is the 32-bit sequence number of TCP packets, $2^{32} = 4$ Gbits = 500 MB of memory is required, which may be impractical or prohibitively expensive in many applications. Instead, certain embodiments use a shorter hash key based on the packet IDs. However, making the hash too short increases the probability of false hits (collisions) caused by mapping too many sequence numbers to the same location in the memory.

In general, the worst case probability of a false hit for each packet can be written as:

$$p_{fh} = 1 - \left(1 - \frac{1}{L}\right)^{\frac{TW}{B}}, \quad (10)$$

where $p_{fh}$ denotes the probability of a false hit, i.e., the probability that a new packet is falsely identified as a retransmission of a previously dropped packet during the test interval. L is the memory size in bits, T is the total duration of the test, W is the link speed in bits/sec, and B is the average packet size in bits. In order to have a small false hit rate, $1/L \approx (TW)/B$, which results in:

$$p_{fh} \approx \frac{TW}{LB} \quad (11)$$

The above equation gives the minimum required memory size for a low false hit probability. For example, if T=4 s, W=1 Gbps, B=1 kB, and L=32 MB, then the probability of a false hit is about 0.002.

The nonconforming proportion of data packets in an aggregate in the retransmission embodiments will now be discussed. The rate of transmitted packets is assumed to be $\lambda_D(t)$, from which $\lambda_R(t)$ are retransmitted packets. If the arriving packets are dropped with perturbing function:

$$r(t) = A\Sigma c_j p_{T_c}(t-(j-1)T_c) = As(t), \quad (12)$$

then $\lambda_R(t)$ is expected to correspond to the shape of function r(t). Similar to SYN packet/ACK packet embodiment, the deviation yields the proportion of nonconforming packets in the aggregate, including scenarios where packets drops are not followed by a retransmission and scenarios where packets are blindly transmitted without a corresponding packet drop. Applying the following transformation to follow previously derived system equations:

$$\lambda_S(t) = \lambda_D(t)$$

$$\lambda_A(t) = \lambda_D(t) - \lambda_R(t), \quad (13)$$

which corresponds to the case of SYN and ACK packets, and the previously described results automatically extend to this case. Thus, the following matched filter output is defined:

$$\alpha = \int_0^{NT_c} \lambda_R(t) s^a(t) dt \quad (14)$$

It is straightforward to verify that the predicted nominal value for the matched filter output in this case is:

$$\alpha = \frac{m}{2} \quad (15)$$

in which m is the total number of packets dropped during the test interval. Deviation of the observed matched filter output from the above value gives an estimator for finding the fraction of nonconforming packets:

$$\hat{p} = 1 - \frac{2\alpha}{m} \quad (16)$$

It is considered to be an advantage of the invention that the compliance test does not depend on an assumption that the paths between a DDoS source and the victim are symmetric. Both the TCP SYN packets and the ACK packets are sent from a TCP client to a server and traverse the same path. This is also true for the TCP data packets and their retransmissions.

It is yet another beneficial feature of the invention that it is immune to blind transmissions of ACK packets. Such blind transmission occurs in a DDoS attack where the offending sources send an ACK packet corresponding to every SYN packet they send to the victim to mislead the intermediate routers that are performing the conformance test. However, using the signature-based conformance tests of the present invention avoids false negatives generated by such blind retransmissions. The present invention detects both SYN packets that are blindly followed by ACKs and those that are not followed by ACK packets. The blind transmission of ACK packets causes a DC shift in $\lambda_S(t)-\lambda_A(t)$, and it will not change the component of the signature appearing on this signal in response to perturbations.

Figure 5A:
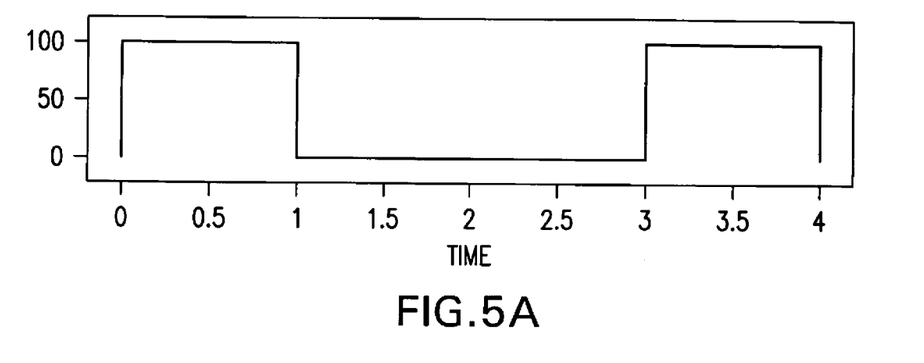
FIGS. 5A-5C are graphs illustrating rate differences between arrival of SYN packets and arrival of ACK packets in accordance with aspects of the present invention.

To illustrate the benefits of the invention, assume a router receives 10,000 SYN packets per second, and it uses a perturbation signature generated by {1, 0, 0, 1}, N=4, A=100, and $T_c$=1 second to evaluate the conformance to protocol. The router drops one (1) percent of arriving SYN packets when s(t)=1. The following three cases are considered:

Case 1: In the first case, no nonconforming SYN packets exist in the aggregate, and both the SYN rate and the ACK rate are received at approximately 10,000 packets per second when there is no perturbation. When the perturbation is applied, the ACK rate decreases to $\lambda_A(t)$=9900 packets per second. The difference between the SYN arrival rate and the ACK arrival rate is illustrated in FIG. 5A. The waveform of FIG. 5A, when integrated, produces the expected nominal value of the matched filter output as α=100.

Figure 5B:
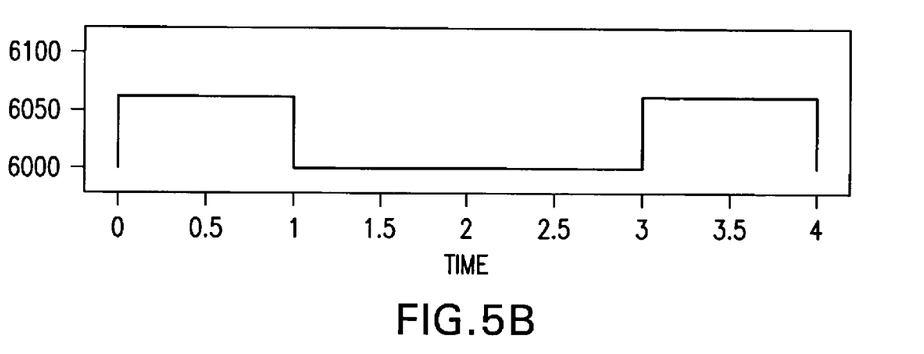

Case 2: In this case, 40 percent of the SYN packets are nonconforming and are not followed up in the three-way handshake by a corresponding ACK packet. The difference between the SYN arrival rate and the ACK arrival rate in this case is illustrated in FIG. 5B. The arrival rate of ACK packets is 6,000 when the traffic is not perturbed and is 5,940 packets per second when 100 packets per second are randomly dropped. That is, from the 100 per second dropped SYN packets during the perturbation, only 60 packets per second correspond to the conforming SYNs, and the other 40 packets per second are not followed by ACK packets in the three-way handshake. The matched filter output in this case reduces to 60, which, when subtracted from the expected nominal value of α=100, indicates a 40 percent deviation.

Figure 5C:
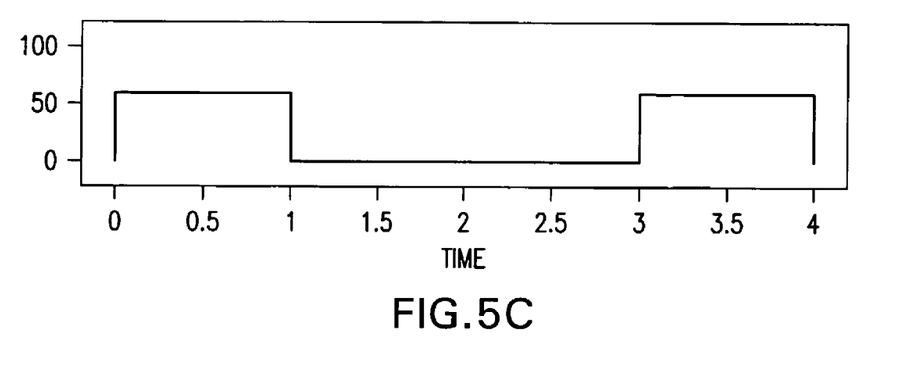

Case 3: In the final case, 40 percent of SYNs are followed by blindly transmitted ACK packets. The other 60 percent is composed of legitimate SYN packets. In this case, if no SYN packets are dropped, 10,000 ACK packets per second will be observed, and in the intervals when SYN packets are dropped, 9940 ACKs per second will be observed. That is, from 100 per second packet drops during the test, 40 of ACK packets are sent regardless of the server response. In this case, the output of matched filter is 60 again, and similar to the previous case, the matched filter output estimates 40 percent nonconforming traffic. This case is illustrated in FIG. 5C.

The numerical examples described above show that blind transmissions of ACKs cannot mislead the modified CAPM in detecting nonconforming SYN packets. When blind ACK packets are sent, they are not aligned with the perturbation signature and are thus received in a manner that is inconsistent with the protocol as conditioned by the packet drop rate corresponding with the perturbation signature. Only compliant ACK packets will be received with the correct timing, i.e., received at a time consistent with the dropped SYN packet, and the integration operation of the filter will produce a conformance measure that accounts for such timing.

Figure 6A:
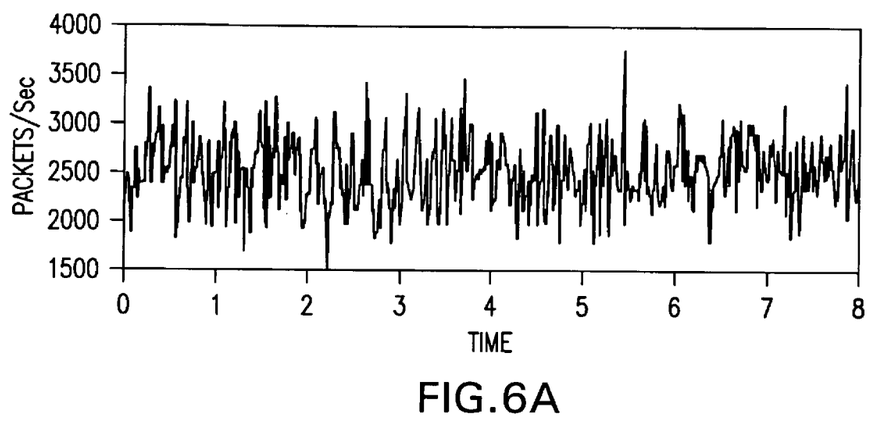
FIGS. 6A-6D are graphs illustrating conformance measure processing in accordance with the present invention.
Figure 6B:
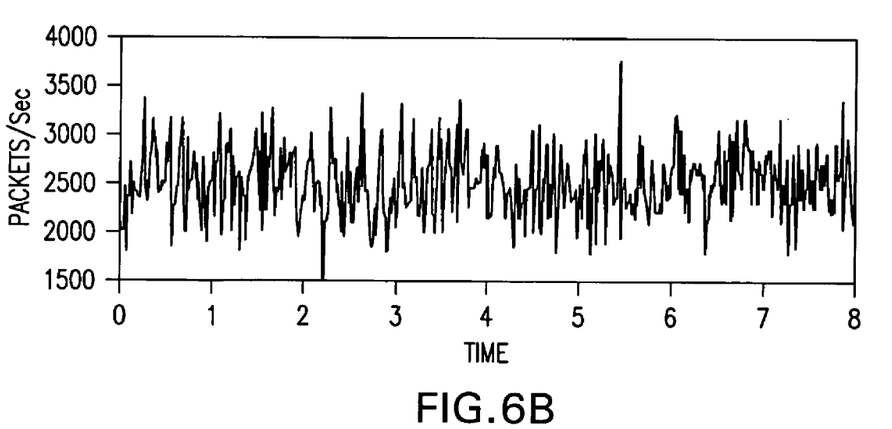
Figure 6C:
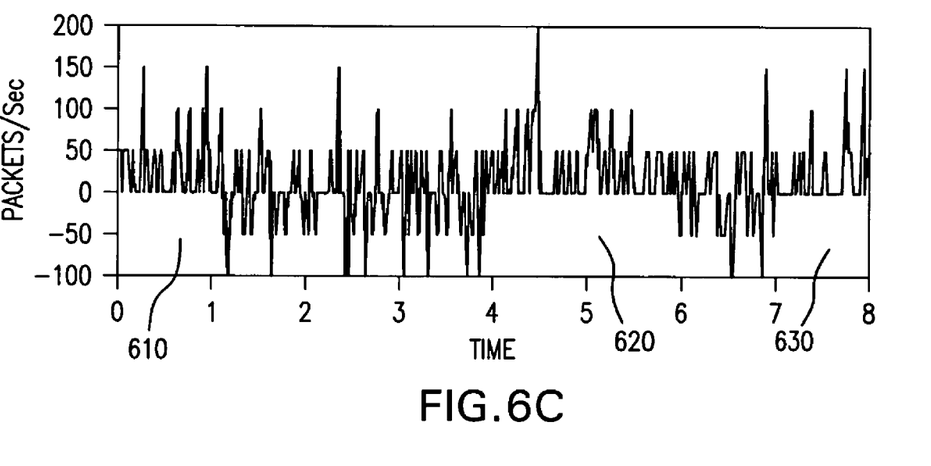
Figure 6D:
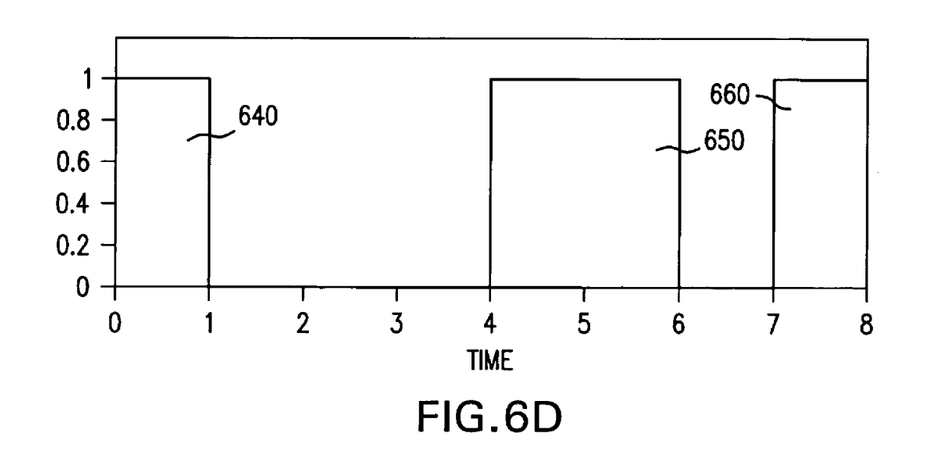

FIGS. 6A-6D demonstrate the processing steps of the present invention in view of its underlying signal processing. FIG. 6A is a graph of the arrival rate of SYN packets at a node and the corresponding arrival rate of ACK packets responsive to the drop signature is illustrated in FIG. 6B. The difference of the arrival rates is depicted in FIG. 6C, where it is to be noted that the regions 610, 620 and 630 correspond to the regions 630, 650 and 660, respectively, of the normalized perturbation signal depicted in FIG. 6D. Deviation from the form of the signature will be observed by the present invention and will be reported to interested parties, as will be described below.

Figure 7:
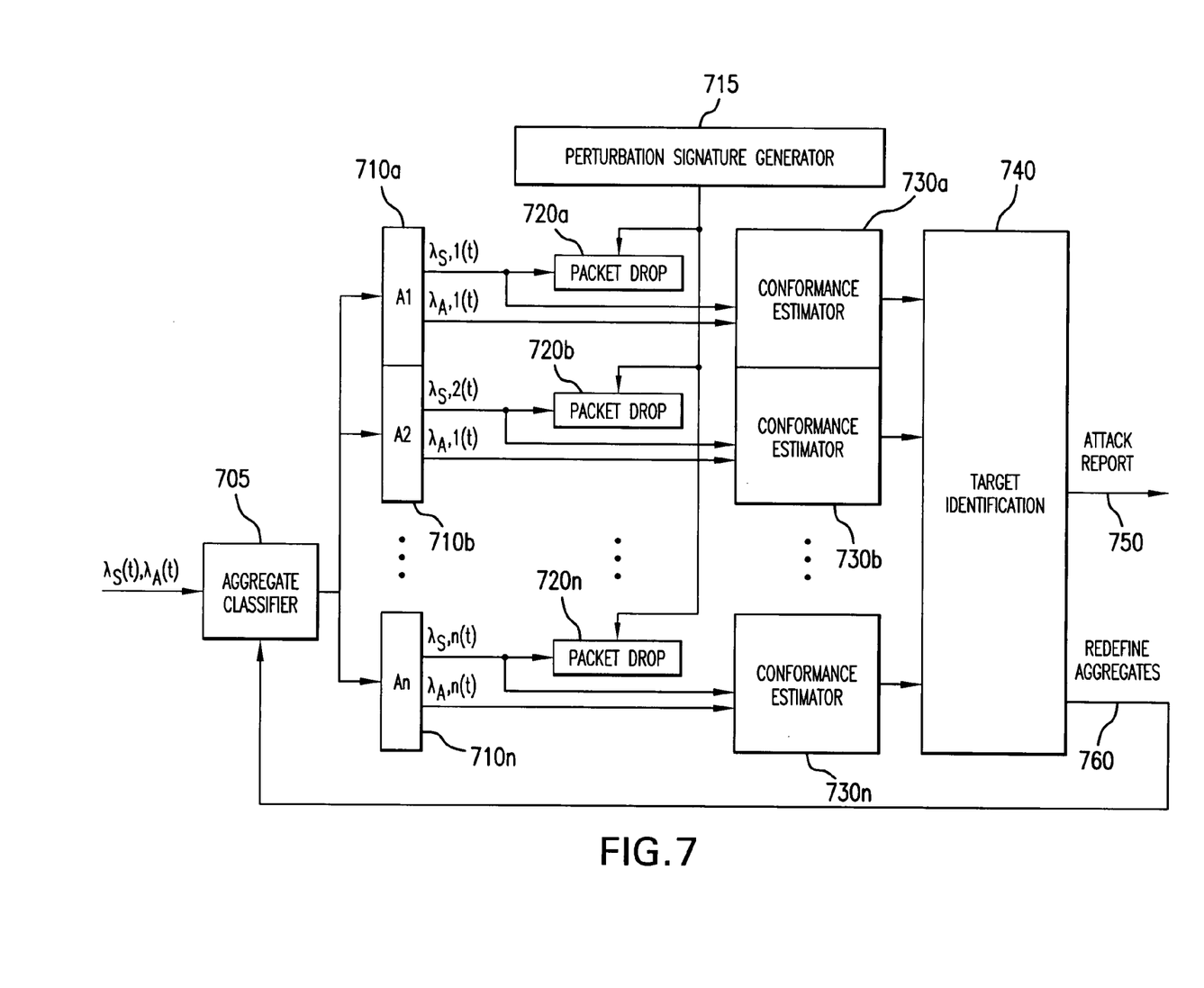
FIG. 7 is a schematic block diagram of an exemplary embodiment of a system for carrying out the present invention.

Referring now to FIG. 7, there is shown an exemplary system configuration suitable for carrying out the invention. The embodiment of FIG. 7 is depicted through functional blocks, which may be implemented in hardware, software or a combination of both hardware and software in a router or other device placed in the communication network. The embodiment of FIG. 7 is shown to describe functional aspects of the invention, which may be fulfilled in a wide variety of ways and not only by the embodiment depicted. The embodiment will be described in terms of the SYN packet and ACK packet conformance measure described above, with the understanding that the invention may be extended to other packet types as previously described.

As is shown in the Figure, SYN packets arrive at a router enhanced by the invention with rate $\lambda_S(t)$ and ACK packets arrive with rate $\lambda_A(t)$. The traffic flows containing the SYN and ACK packets are classified by aggregate classifier 705. In certain embodiments, the aggregates are initially formed in accordance with some portion of the destination IP address, or some other aspect of the destination address, such as a subnet. This initial aggregate classification may stay in effect until an aggregate is found to contain nonconforming flows. At that point, the offending aggregate may be redefined to separate finer details about the IP address of the attacked node until the aggregates are formed at sufficient granularity as to positively identify the attacked node.

The aggregate classifier forms the flows into aggregates A1-An as indicated at 710a-710n and are tracked by suitable methods, such as by binning. A number of SYN packets are dropped at 720a-720n respectively from the aggregates 710a-710n in accordance with the perturbation signature generated by perturbation signature generator 715. The rate of arrival of the ACK packets and the rate of arrival of the SYN packets are provided to the corresponding conformance estimator 730a-730n, where the conformance to protocol is determined by the techniques described above. The output of the estimators 730a-730n are provided to a target identification system, which identifies a nonconforming aggregate and then either redefines the nonconforming aggregate to isolate the attacked node, as indicated at 760, or reports the address of the attacked node if the aggregate granularity affords such, as indicated at 750. The attacked node may then take mitigating action, such as decreasing the timeout period for holding resources open in half-open connections. Other mitigating action is known and may be taken as appropriate.

Figure 8:
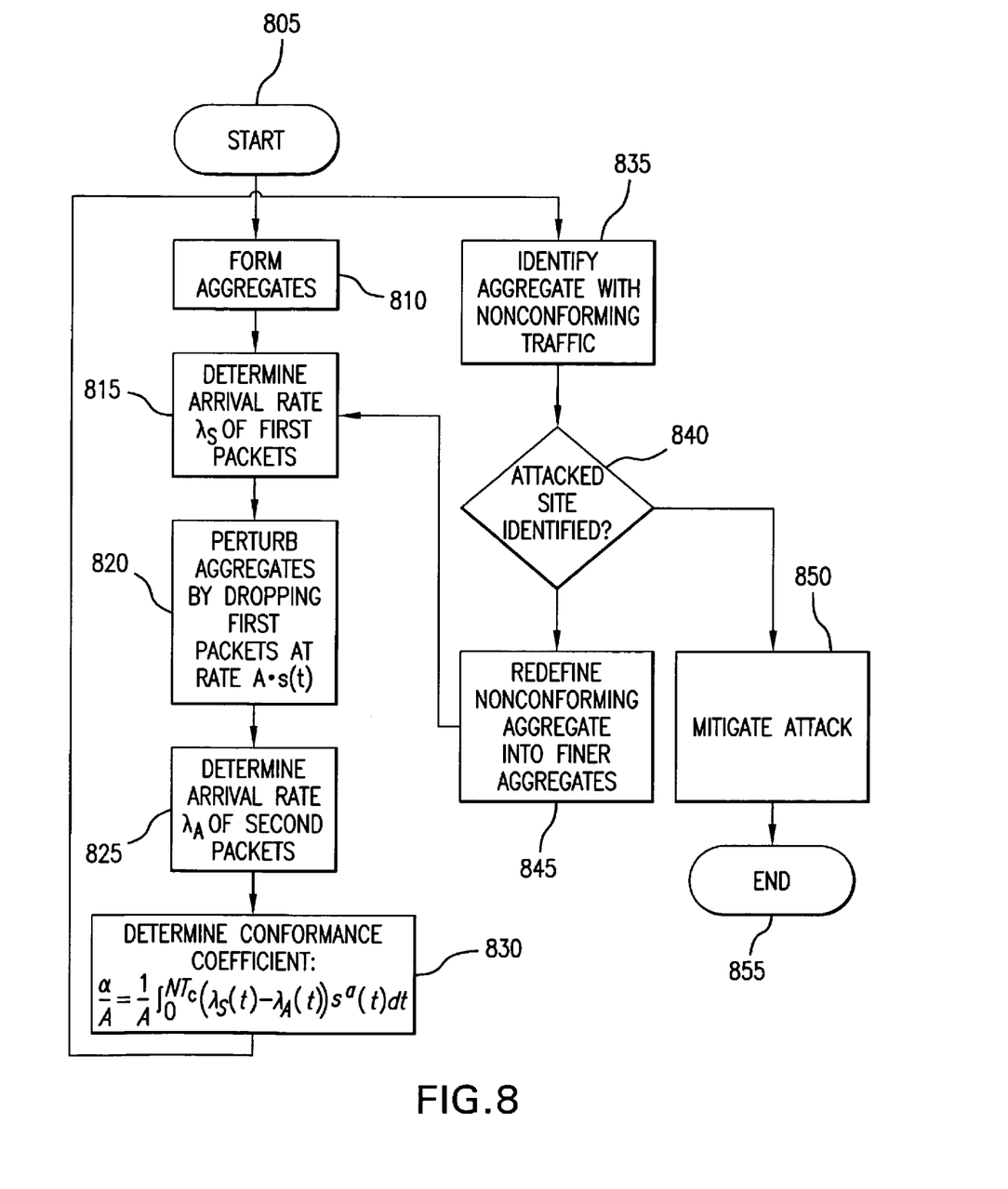
FIG. 8 is a flow diagram illustrating certain procedural steps for carrying out the present invention.

FIG. 8 illustrates by way of a flow diagram certain exemplary method steps for carrying out embodiments of the invention. Upon entering the process at block 805, flow is transferred to block 810, whereby flow aggregates are formed as described above. The arrival rate of first packets, e.g., SYN packets or TCP data packets, is determined at block 815. The aggregates are perturbed by dropping packets in accordance with the perturbation signature s(t), as indicated at block 820. The arrival rate of second packets, e.g., ACK packets or retransmitted TCP packets, is determined at block 825. Flow is then transferred to block 830, whereby a conformance coefficient is calculated from the arrival rates of first and second packets. In block 835, nonconforming aggregates are identified by comparison to normal traffic filter estimates, as described above. It is then determined if an attacked site is identified. If the aggregates are defined at a coarse granularity so that the attacked site cannot be isolated, as determined at block 840, the aggregates are redefined to a finer granularity and the process is directed to continue at block 815. If the attacked site can be identified at block 840, the attack is mitigated by suitable measures at block 850 and the process may be terminated at block 855.

The descriptions above are intended to illustrate possible implementations of the present invention and are not restrictive. Many variations, modifications and alternatives will become apparent to the skilled artisan upon review of this disclosure. For example, components equivalent to those shown and described may be substituted therefor, elements and method steps individually described may be combined, and elements described as discrete may be distributed across many components. The scope of the invention should therefore be determined not with reference to the descriptions above, but with reference to the appended claims along with their full range of equivalents.

What is claimed is:

1. A method for detecting protocol noncompliant communication network traffic indicative of a distributed denial of service attack on a node of a communication network, the communication network having a plurality of switching nodes for routing information packets between a plurality of source nodes and a plurality of destination nodes, the network traffic including information packets formatted in compliance with a communication network protocol and having an indication of an address of a source node in the network and an indication of an address of a destination node in the network, each of the packets belonging to a corresponding one of a plurality of traffic flows such that the packets of each of the traffic flows are addressed from a common source node and addressed to a common destination node, the method comprising:

assigning each of the traffic flows to a corresponding one of a plurality of traffic flow aggregates such that a portion of the address of the common destination node is common to the traffic flows in said corresponding aggregate, the traffic flows in said aggregates including first packets and second packets such that said second packets are transmitted only upon one of either success or failure of transmission of said first packets;

dropping a plurality of said first packets from each of said traffic flow aggregates at each of a plurality of routing nodes, said first packets being dropped at each routing node at a packet dropping rate set in accordance with a respective predetermined drop signature waveform, each of said drop signature waveforms being orthogonal to drop signature waveforms at other routing nodes;

identifying at each said routing node a noncompliant aggregate as one of said traffic flow aggregates having said second packets received at an arrival rate noncompliant with the communication network protocol as conditioned by said corresponding packet dropping rate;

identifying an attacked node in the communication network from said portion of the address of the common destination node common to said traffic flows of said noncompliant aggregate;

redefining said noncompliant aggregate into a plurality of aggregates upon a determination that said address of said common destination node could not be identified from said portion of the address of the common destination node in said attacked node identification step; and repeating the method at said first packets dropping step.

2. The method for detecting protocol noncompliant communication network traffic as recited in claim 1 including selecting packets formatted for transmitting substantive data from a source node as said first packets and selecting as said second packets said substantive data packets as retransmitted from said source node responsive to said first packets being dropped.

3. The method for detecting protocol noncompliant communication network traffic as recited in claim 1 including:

determining a nominal arrival rate of said second packets expected for a corresponding one of said predetermined drop signature waveforms; and comparing in said noncompliant aggregate identifying step said packet arrival rate of said second packets with said nominal arrival rate.

4. The method for detecting protocol noncompliant communication network traffic as recited in claim 1 further including assigning a codeword of a predetermined number of bits as said drop signature waveform, where a bit thereof having a value of one is associated with dropping said first packets at said packet dropping rate during a predetermined interval and a bit thereof having a value of zero is associated with dropping none of said first packets during said predetermined interval.

5. The method for detecting protocol noncompliant communication network traffic as recited in claim 4 including assigning a pseudonoise code as said codeword.

6. The method for detecting protocol noncompliant communication network traffic as recited in claim 4 including generating said codeword to have a number of bits having a value of zero equal to a number of bits having a value of one.

7. The method for detecting protocol noncompliant communication network traffic as recited in claim 1 including determining a conformance measure as an integration operation over a length of each of said drop signature waveforms of a difference between an arrival rate of said first packets and said arrival rate of said second packets.

8. The method for detecting protocol noncompliant communication network traffic as recited in claim 7 including comparing said conformance measure to an expected value of said conformance measure as predetermined from characteristics of a corresponding drop signature waveform.

9. The method for detecting protocol noncompliant communication network traffic as recited in claim 1 including selecting as said first packets transmission control protocol compliant synchronization packets and selecting as said second packets transmission control protocol compliant acknowledge packets.

10. A system for detecting protocol noncompliant communication network traffic indicative of a distributed denial of service attack on a node of a communication network, the network traffic including information packets formatted in compliance with a communication network protocol and having an indication of an address of a source node in the network and an indication of an address of a destination node in the network, each of the packets belonging to a corresponding one of a plurality of traffic flows such that the packets of each of the traffic flows are addressed from a common source node and addressed to a common destination node, the system comprising:
an aggregate classifier assigning each of the traffic flows to a corresponding one of a plurality of traffic flow aggregates such that a portion of the address of the common destination node is common to the traffic flows in said corresponding aggregate, the traffic flows in said aggregates including first packets and second packets such that said second packets are transmitted only upon one of either success or failure of transmission of said first packets;
a perturbation signature generator generating a drop signature waveform having characteristics that are orthogonal to other drop signature waveforms at other nodes in the communication network;
a packet dropper coupled to said perturbation signature generator and dropping a plurality of said first packets from each of said traffic flow aggregates at a packet dropping rate defined by a respective drop signature waveform;
a conformance estimator coupled to said aggregate classifier and identifying a noncompliant aggregate as one of said traffic flow aggregates having said second packets received thereat noncompliant with the communication network protocol as conditioned by said dropped packet rate; and
a target identifier coupled to said conformance estimator and identifying an attacked node in the communication network from said portion of the address of the common destination node common to said traffic flows of said noncompliant aggregate; wherein said target identifier signals said aggregate classifier to redefine said noncompliant aggregate into a plurality of aggregates if the address of the destination node is not identified from said portion of the address of the common node common to said traffic flows of said noncompliant aggregate.

11. The system for detecting protocol noncompliant communication network traffic as recited in claim 10, wherein said perturbation signal generator, said packet dropper, said conformance estimator and said target identifier are installed in a router.

12. A method for detecting protocol noncompliant communication network traffic indicative of a distributed denial of service attack on a node of a communication network, the network traffic including information packets formatted in compliance with a communication network protocol and having an indication of an address of a source node in the network and an indication of an address of a destination node in the network, each of the packets belonging to a corresponding one of a plurality of traffic flows such that the packets of each of the traffic flows are addressed from a common source node and addressed to a common destination node, the method comprising: assigning each of the traffic flows to a corresponding one of a plurality of traffic flow aggregates such that a portion of the address of the common destination node is common to the traffic flows in said corresponding aggregate, the traffic flows in said aggregates including first packets and second packets such that said second packets are transmitted only upon one of either success or failure of transmission of said first packets; dropping a plurality of said first packets from each of said traffic flow aggregates at a packet dropping rate set in accordance with a predetermined drop signature waveform; identifying a noncompliant aggregate as one of the traffic flow aggregates having said second packets received at an arrival rate noncompliant with the communication network protocol as conditioned by said packet dropping rate; and identifying an attacked node in the communication network from said portion of said address of the common destination node common among said traffic flows of said noncompliant aggregate; assigning a drop signature waveform to be orthogonal to a drop signature waveform assigned to at least one other routing node in the communication network; and, assigning a codeword of a predetermined number of bits as said drop signature waveform, where a bit thereof having a value of one is associated with dropping said first packets at said packet dropping rate during a predetermined interval and a bit thereof having a value of zero is associated with dropping none of the first packets during said predetermined interval.

13. The method for detecting protocol noncompliant communication network traffic as recited in claim 12 including selecting packets formatted for transmitting substantive data from a source node as said first packets and selecting as said second packets said substantive data packets as retransmitted from said source node responsive to said first packets being dropped.

14. The method for detecting protocol noncompliant communication network traffic as recited in claim 12 including selecting as said first packets transmission control protocol compliant synchronization packets and selecting as said second packets transmission control protocol compliant acknowledge packets.

15. The method for detecting protocol noncompliant communication network traffic as recited in claim 12 including: determining a nominal arrival rate of said second packets expected for said predetermined drop signature waveform; and comparing in said noncompliant aggregate identifying step said packet arrival rate of said second packets with said nominal arrival rate during said predetermined interval.

16. The method for detecting protocol noncompliant communication network traffic as recited in claim 12 including assigning a pseudonoise code as said codeword.

* * * * *